July 25, 1939.    H. HONNEF ET AL    2,167,265
POWER GENERATOR
Filed Nov. 10, 1937
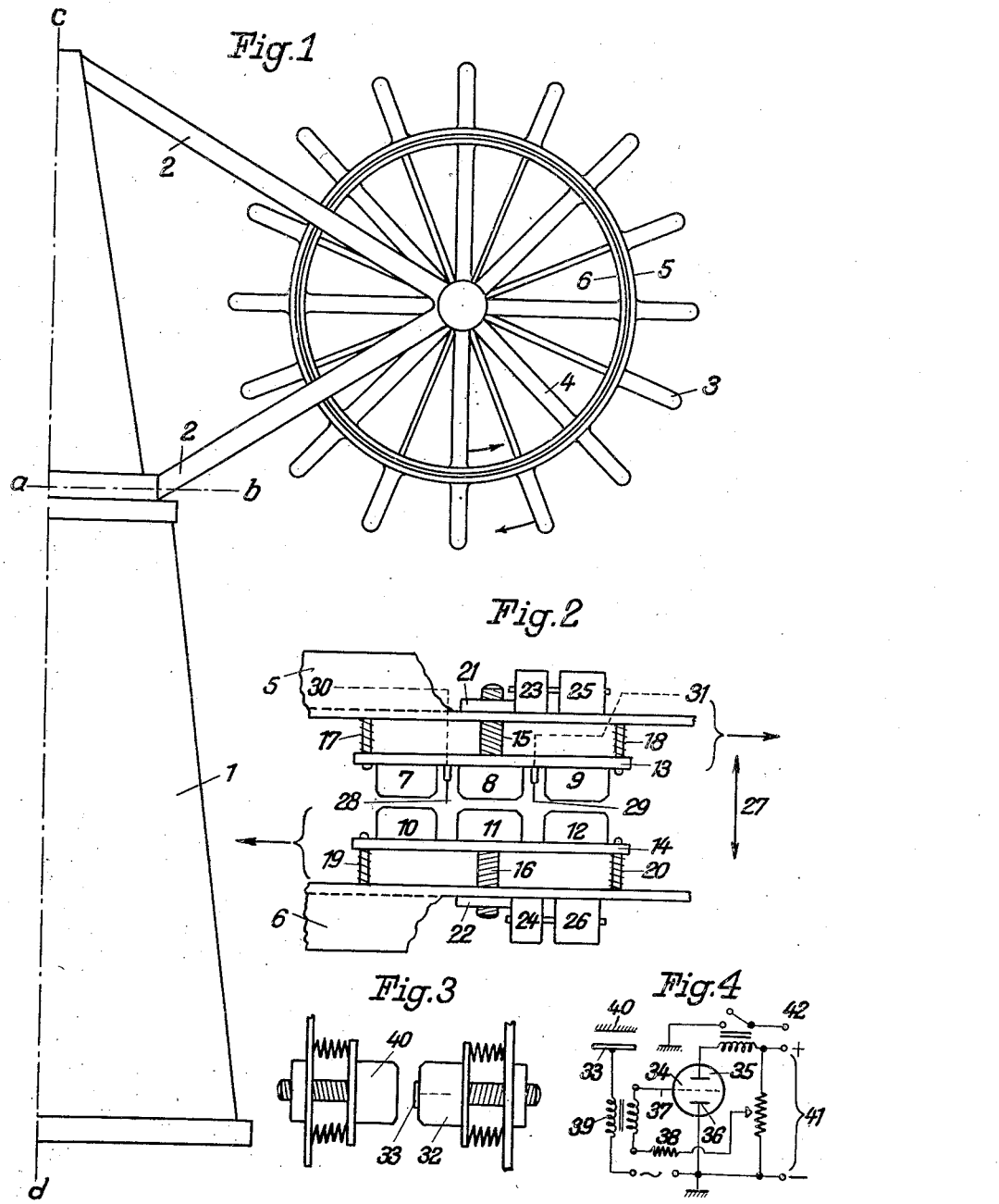
Inventors:
Hermann Honnef
Heinrich Geffcken
By: Richardson
Attys Patented July 25, 1939

2,167,265

UNITED STATES PATENT OFFICE 2,167,265

POWER GENERATOR

Hermann Honnef, Berlin, and Heinrich Geffcken, Berlin-Charlottenburg, Germany

Application November 10, 1937, Serial No. 173,818
In Germany November 11, 1936

12 Claims. (Cl. 290—44)

The present invention relates to power generators, and particularly wind-driven generators for producing electrical energy, and is especially concerned with machines of this type wherein the dynamo electric pole systems are supported directly upon the wind turbines. The principles underlying the invention are briefly outlined below.

In constructing wind-power machines of large capacity, it is necessary to operate with very large wind-wheels in order to obtain the required and desired results. Inasmuch as large wind-wheels, about 50 to 150 meters in diameter, for example, must rotate relatively slowly in order to avoid prohibitive peripheral speeds, an economic production of electrical energy is possible only if the wind-wheels are utilized as carriers of the pole-rings of the electrical current generator, giving these pole-rings a very large diameter, for example, about 40 to 80 meters.

Among the difficulties that occur in such structures may be mentioned the displacement of the individual poles, which has a considerable effect upon the width of the air gap between the armature and the field, even in cases where the displacement corresponds only to a minute percentage of the pole-ring diameter, because the width of this gap must be kept as small as possible for electro-dynamic reasons. In practice, it must not go over 2 to 6 centimeters, with a tolerance of plus or minus 1 centimeter. The pole-rings mentioned before must therefore be exceedingly carefully centered and maintained in their centered positions. In order to carry out the proper centering, the moving poles, either individually or in groups, are provided with adjusting devices.

The danger of destroying the centering exists, of course, in such wind-operated machines in accordance with the momentary wind pressure. It is most pronounced during a storm, i.e., during times when a testing of the gap would be most difficult and touching of the poles most disastrous.

In order to overcome these difficulties, the invention proposes a provision whereby the pole-rings of the wind turbines are equipped with remotely controlled devices for supervising the gap width; and the individual poles or pole groups are provided with remotely controlled motors for moving them to regulate the length of the gap. Faults in the centering can thus be detected with the wind turbines in operation, at a time when they do not yet constitute an acute danger, and may be rectified from the switchboard in the power house. In order to avoid that a centering fault grows faster than it can be detected and corrected, it is advisable to utilize the supervisory arrangement in accordance with the invention in such a manner that it is used for directly governing the operation of an auxiliary machine which rotates the turbine out of the wind path as soon as the gap width drops below a permissible point at any test section.

The above noted supervisory arrangement may be realized in various ways. It is possible, for example, to provide insulated contact tongues or blades at one part of the electrical system, which are adapted to contact the poles of the other part in order to close signalling circuits at the moment when a pole moves from its predetermined position. These insulated contact tongues are preferably provided in connection with the field pole ring, because this pole ring carries usually fewer current-conducting leads than the armature pole-ring, and the danger of overloading it with signal means and circuits is thus lessened. The supervision may also be realized inductively or capacitatively, using preferably high frequency operated measuring devices and circuits.

The above noted objects and features will now be described with reference to the accompanying drawing, wherein Fig. 1 shows in a diagrammatic manner the right half of a wind-power machine of large dimensions and large capacity;

Fig. 2 represents on a much larger scale a small section of the concentrically disposed pole-rings shown in Fig. 1;

Fig. 3 shows another manner of disposing the poles on the pole rings; and

Fig. 4 indicates an embodiment of the supervisory equipment and circuits in schematic representation.

Referring now to Fig. 1, numeral 1 indicates a tower which may be about 300 meters high, with cantilevers 2 carrying the concentrically arranged oppositely rotating wind-wheels 3 and 4. The outer wind-wheel 3 may have a diameter of about 150 meters, and the inner wind-wheel 4 a diameter of about 80 meters. The two wind-wheels are equipped with rims 5 and 6, respectively, one carrying the field and the other the armature pole-ring of the electrical generator. Between these pole-rings is a small air gap, just as in any dynamo electrical generator.

Fig. 2 shows a small section of the oppositely disposed pole-rings which rotate in opposite directions. The poles 7, 8, 9 of the outer or field pole-ring, and the poles 10, 11, 12 of the inner or armature pole-ring are fastened on plates 13 and 14, respectively, and these plates are held by the worms 15 and 16, respectively, against the tension of the compression springs 17 and 18, and 19 and 20, respectively. The worms 15 and 16 are in turn held in suitable nuts 21 and 22. The nut 21 is connected to and may be operated by the worms 15 and 16, respectively, against the nut 22 is likewise connected to a gear 24 which is governed by a motor 26. This apparatus is remotely controlled from a suitable point of supervision and may be operated so as to permit adjustment of the mounting plates 13 and 14 in the directions indicated by the double arrow 27, thereby regulating the air gap between the poles. The other two arrows noted on the drawing indicate the direction of the rotary motion of the poles and pole systems on the respective windwheels or turbines.

Between the poles 2, 8 and 9 of the field pole-ring are provided resilient contact tongues 28 and 29, which extend into the air gap and contact the poles on the armature pole-ring at the moment when the width of the gap drops below the permissible point. Inasmuch as the iron masses of the armature pole-ring are grounded, such contacting will close suitable signalling circuits over the conductors which are diagrammatically indicated at 30 and 31, leading to the supervisory control equipment.

The pole-rings may be arranged concentrically, as shown in Fig. 2, with the poles such as 10, 11, 12 projecting radially outwardly from pole-ring 6 and poles such as 7, 8, 9 projecting radially inwardly from pole-ring 5, or they may have the same diameter and be disposed side by side according to Fig. 3, with the poles such as 40, 32 projecting axially from the respective pole-rings. Instead of the resilient contact tongues previously mentioned in connection with the structure shown in Fig. 2, insulated condenser plates such as 33 are embedded in the poles of one pole-ring, as shown in Fig. 3, and these plates are included in a high frequency circuit, such as is shown in Fig. 4, for example. The poles 40 and 32, respectively, may be mounted on their pole-rings in groups in a similar manner as shown in Fig. 2, with similar provisions for moving them to adjust the air gap. These means are diagrammatically indicated in Fig. 3.

The circuit comprises a grid glow tube 34, having the principal electrodes 35 and 36, which are connected to a direct current source 41. The tube 34 has a firing grid 37 which is connected over a resistance 38 to a point of positive voltage against the cathode, and is controlled over a transformer 39 by the high frequency currents which flow from the condensers 33 to ground. As soon as the distance between the poles such as 32 and 40 drops below the permissible limit point, the capacitatively shunted high frequency current exceeds a maximum value and induces a potential on the grid 37 which fires the grid glow tube, thus connecting current to the signalling circuit 42 by actuating a suitable device, for example, a relay included in the circuit as shown.

Instead of such a capacitative "distance or gap meter", it is of course also possible to use an inductive "gap meter". It is necessary in this case to resort to rather high frequencies, to use coils with few turns, and to employ compensation circuits in order to avoid the magnetic influence of the pole masses.

The supervisory circuits controlled over conductors such as 30, 31 in Fig. 2 or including the circuit 42 indicated in Fig. 4, respectively, govern suitable signals at the switchboard, and the remotely controlled motors 25 and 26 or the corresponding motors provided in the arrangement Fig. 3 to move the poles or pole groups 40, 32 or 7, 8, 9 and 10, 11, 12, respectively, are then actuated either automatically or responsive to the operation of suitable switch gear for the purpose of regulating the gap width.

It is understood, of course, that the arrangements indicated in Figs. 2, 3 and 4 may be suitably used either with structures wherein the pole-rings are disposed concentrically, as shown in Fig. 2, or in axial alignment, as indicated in Fig. 3.

In accordance with another feature of the invention, a suitable auxiliary motor may be automatically operated through the supervisory equipment, for example, through switching means actuated simultaneously with or governed by the circuit 42 shown in Fig. 4, whereby the cantilever system 2 is turned either through a horizontal arc (a—b) or a vertical arc (a—c) by 90° so that the wind turbines 3 and 4 are swung out of the wind and gradually slow up to a standstill. The danger of destroying the turbines through a mechanical contacting of the oppositely rotating pole-rings is substantially eliminated through such an auxiliary arrangement.

We claim:

1. In a wind generator, two wind wheels rotating in opposite directions, a field pole ring mounted on one wheel, an armature pole ring mounted on the other wheel, each pole ring supporting a system of poles rotating in close proximity to the poles of the other system, and means for closing a signalling circuit responsive to a decrease in the length of the air gap between the two pole systems.

2. In a wind generator, two wind wheels rotating in opposite directions, a field pole ring mounted on one wheel, an armature pole ring mounted on the other wheel, each pole ring supporting a system of poles rotating in close proximity to the poles of the other system, and means for moving the poles of one system while the associated wind wheel is in motion to regulate the length of the air gap between the poles of the two systems.

3. In a wind generator, two wind wheels rotating in opposite directions, a field pole ring mounted on one wheel, an armature pole ring mounted on the other wheel, each pole ring supporting a system of poles rotating in close proximity to the poles of the other system, a control circuit, means for closing said circuit while the wheels are in motion in the event that one pole system should approach too closely to the other, and means responsive to the closure of said circuit for automatically moving the poles of one system to increase the length of the air gap.

4. In a generator, a rotatable ring member equipped with a plurality of poles, said poles being divided into groups, an adjustable supporting means for each group of poles providing for radial movement thereof, and means for separately operating said adjusting means while the said ring member is in motion.

5. In a generator, a field pole ring, an armature pole ring adapted for rotation relative to said field pole ring, means for detecting an undue shortening of the air gap between an armature pole and the field poles while the armature is rotating, and means for moving said armature pole while the armature is rotating to restore the air gap to its proper length.

6. In a generator, two pole systems adapted for rotation relative to each other with a small air gap between them, a plurality of contact members distributed around one pole system and extending into said air gap so that if the air gap should be unduly shortened at any point the nearest contact member or members will strike the poles of the other system, and a supervisory circuit closed by engagement of one of said contact members with a pole of the other system.

7. In a generator, two pole systems adapted for relative rotation with an air gap between them, insulated plate members supported on the faces of the poles of one system and forming condensers with the poles of the other system, a circuit including a source of alternating current and said condensers, a supervisory circuit, and means responsive to an increase of current in said first circuit due to a shortening of the air gap and resulting increase in capacity of said condensers for closing said supervisory circuit.

8. In a wind generator, two wind wheels rotating in opposite directions, a pole system mounted on one wheel and a pole system mounted on the other wheel, said systems rotating in close proximity to each other, and means for automatically swinging said wind wheels out of the wind responsive to a decrease in the air gap between said systems below a predetermined limit.

9. In a wind generator, two wind wheels rotating in opposite directions, a field pole ring mounted on one wheel, an armature pole ring mounted on the other wheel, each pole ring supporting a system of poles rotating in close proximity to the poles of the other system, the poles of one system being divided into groups, and means for radially adjusting each of said groups of poles independent of the other groups while the wind wheels are in motion.

10. In a wind generator, two wind wheels rotating in opposite directions, a field pole ring mounted on one wheel, an armature pole ring mounted on the other wheel, each pole ring supporting a system of poles rotating in close proximity to the poles of the other system, means for detecting an undue shortening of the air gap between an armature pole and the field poles while the wind wheels are rotating, and means for moving such armature pole while the wind wheels are rotating to restore the air gap to its proper length.

11. In a wind generator, two wind wheels rotating in opposite directions, a field pole ring mounted on one wheel, an armature pole ring mounted on the other wheel, each pole ring supporting a system of poles rotating in close proximity to the poles of the other system, a contact member rotating with one pole system and adapted to be engaged by one or more poles of the other system if the air gap between the two pole systems should become too small, and a supervisory circuit including said contact member.

12. In a wind generator, two wind wheels rotating in opposite directions, a field pole ring mounted on one wheel, an armature pole ring mounted on the other wheel, each pole ring supporting a system of poles rotating in close proximity to the poles of the other system, a supervisory circuit, a condenser including an insulated metallic member secured to a pole of one system and any pole of the other system, a circuit in which a variable current is caused to flow by changes in the capacity of said condenser due to changes in the length of the air gap between said pole systems, and means in said last mentioned circuit for controlling said supervisory circuit.

HERMANN HONNEF.
HEINRICH GEFFCKEN.